F. T. HOPKINS.
METHOD OF ADVERTISING AND APPARATUS THEREFOR.
APPLICATION FILED FEB. 14, 1914.

1,152,092.  Patented Aug. 31, 1915.
4 SHEETS—SHEET 1.

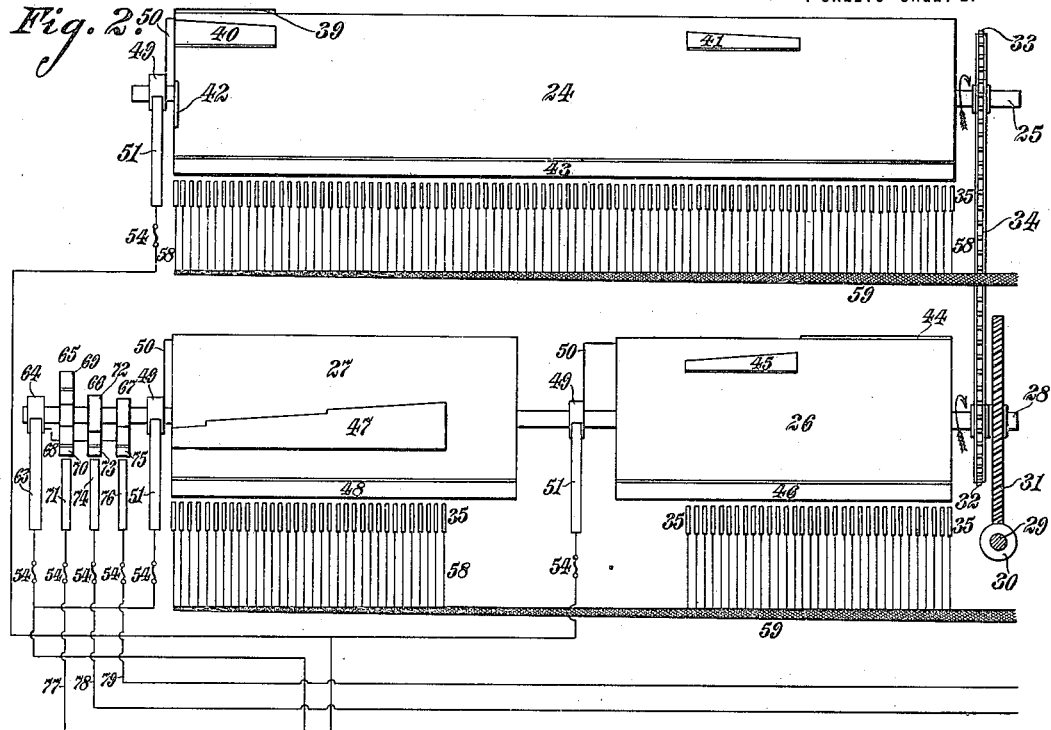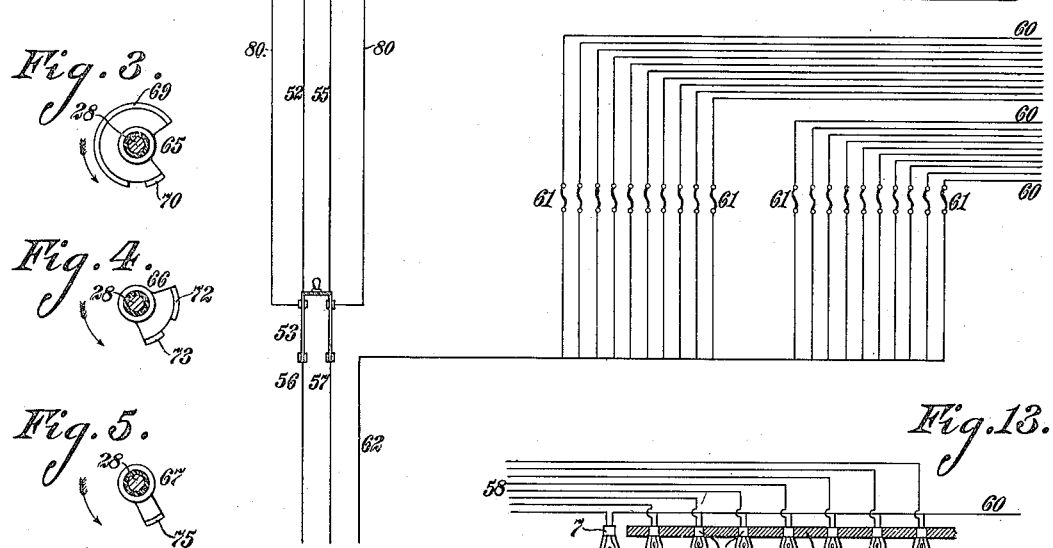

F. T. HOPKINS.
METHOD OF ADVERTISING AND APPARATUS THEREFOR.
APPLICATION FILED FEB. 14, 1914.

1,152,092.

Patented Aug. 31, 1915.
4 SHEETS—SHEET 3.

Witnesses:
Harry H. Reiss.
George G. Anderson.

Inventor:
FRANK THOMPSON HOPKINS,
by Hugh K. Wagner
His Attorney.

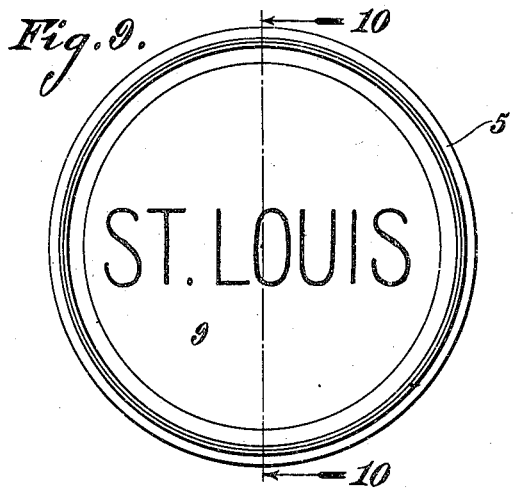
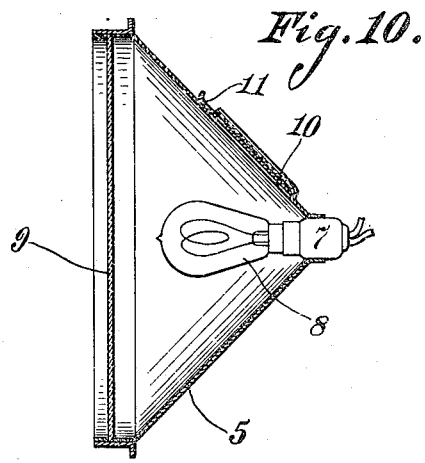
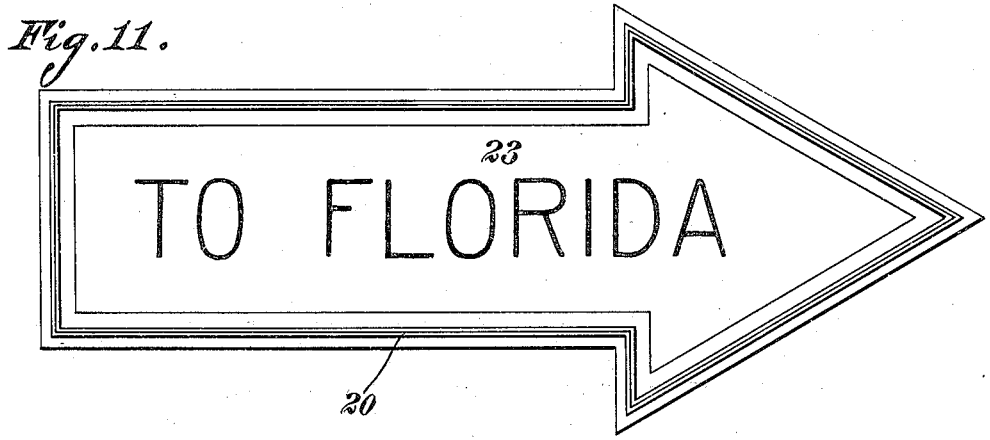
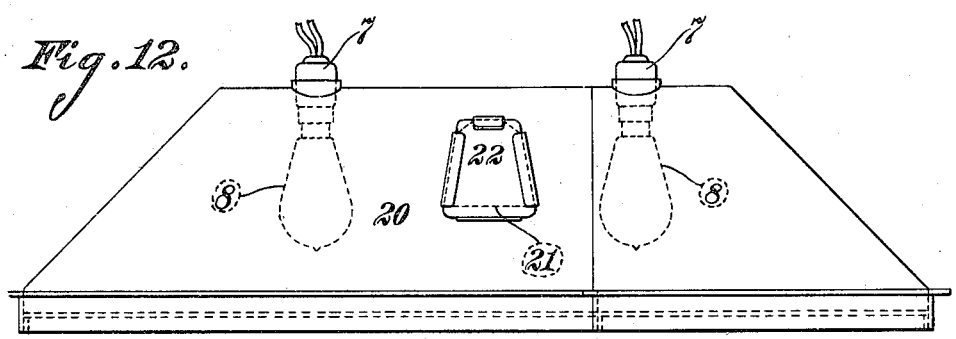

UNITED STATES PATENT OFFICE.

FRANK THOMPSON HOPKINS, OF ST. LOUIS, MISSOURI, ASSIGNOR TO THOS. CUSACK COMPANY, OF CHICAGO, ILLINOIS, A CORPORATION OF NEW JERSEY.

METHOD OF ADVERTISING AND APPARATUS THEREFOR.

1,152,092.  Specification of Letters Patent.  Patented Aug. 31, 1915.

Application filed February 14, 1914. Serial No. 818,662.

*To all whom it may concern:*

Be it known that I, FRANK THOMPSON HOPKINS, a citizen of the United States, residing at the city of St. Louis, State of Missouri, have invented certain new and useful Improvements in Methods of Advertising and Apparatus Therefor, of which the following is a specification.

This invention consists of an improved method of and apparatus for advertising, and is particularly adapted for use to display, preferably by illuminating means, the routes and runs of trains of a railway system, though, of course, is equally well adapted for similar use for displaying the routes and runs of ships, boats, and other conveyances, for displaying the course and progress of a disease in the human system, and for various other purposes.

Figure 1:
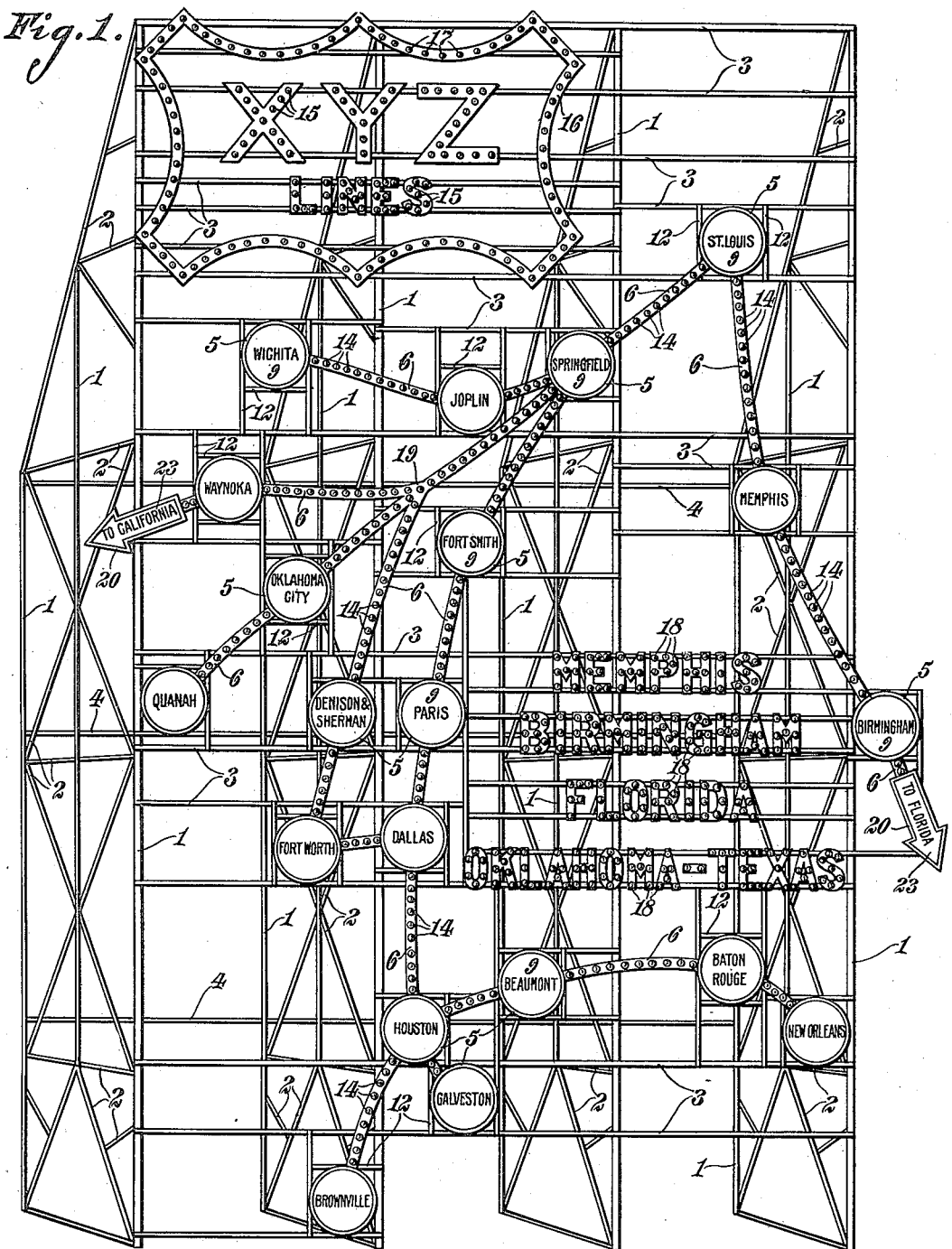
Figure 6:
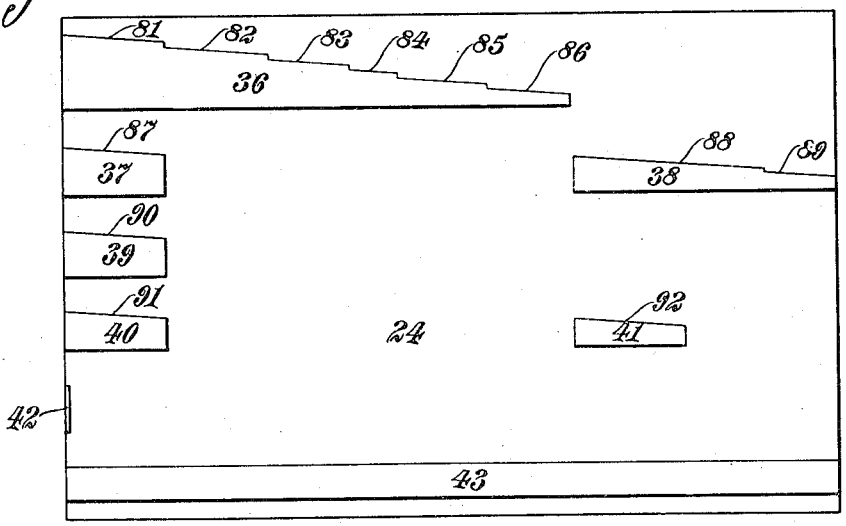
Figure 8:
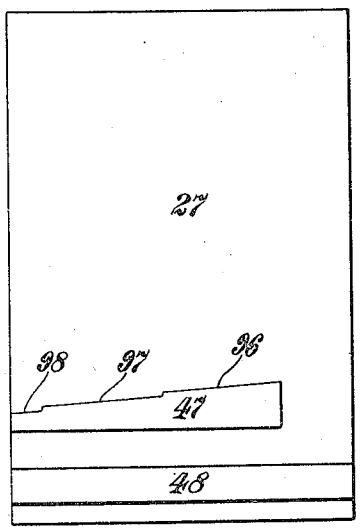
Figure 7:
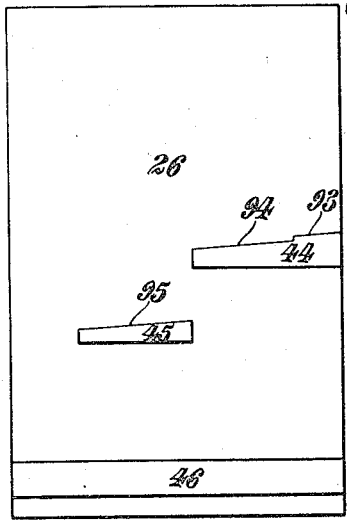

In the accompanying drawings forming part of this specification, in which like numbers of reference denote like parts wherever they occur, Figure 1 is a perspective view of an electric sign with a skeleton map of a railway system thereon; Fig. 2 is a diagrammatical view of the flasher and the wiring therefor; Figs. 3, 4, and 5 are detailed views of parts of the flasher; Figs. 6, 7, and 8 are circumferential views of the flasher drums; Fig. 9 is a front view, on an enlarged scale, of one of the city lamp-holders; Fig. 10 is a sectional view on the line 10—10, Fig. 9; Fig. 11 is a front view, on an enlarged scale, of one of the arrows; Fig. 12 is a side elevation of same; and Fig. 13 is a longitudinal sectional view of a portion of a track section.

In the improved method of advertising embodying the present invention, an apparatus consisting of a framework of suitable construction and an electric sign supported thereby is employed. The framework, as shown in the drawings, comprises a plurality of bents, which stand substantially vertically in spaced parallel relation. Each bent is preferably formed with a trapezoidal configuration, and consists of uprights 1, which are connected by suitable braces 2, the front uprights of the several bents being preferably higher than the rear uprights and being connected by horizontal members 3 and the rear uprights of the several bents being connected by horizontal members 4.

For the purpose of illustration an electric sign representing the skeleton map of a railway system is depicted in the drawings, same being supported by the horizontal members 3 on the front of the framework and consisting essentially of the city or station lamp-holders 5, which are distributed in proper relation over the front of the framework, and the track sections 6, which connect same. Each city or station lamp-holder 5, as depicted in detail in Figs. 9 and 10, is preferably conical in shape, being formed of sheet metal and having a lamp-socket 7 secured in its apex or rear end in any suitable manner for the reception of an electric lamp 8, the front of same being closed by a circular piece 9 of glass or other transparent or translucent material which is held in place by any suitable means. The name of the city or station may be painted or otherwise applied on the face of the glass 9 so that, when the circuit of the lamp 8 is closed in the manner hereinafter described, the name of the city or station can be easily read. An opening 10 is provided in the wall of said lamp-holder to allow the lamp to be renewed when necessary, and a door 11 is preferably slidably supported over said opening to keep same closed. Said lamp-holder 5 is located between two horizontal members 3 and is riveted, wired, or otherwise secured to same and, also, to the member or members 12 or to a front upright 1 adjacent thereto. Each track section 6 is preferably formed of iron or other suitable material and has a plurality of lamp-sockets 13 secured thereto for the reception of the electric lamps 14, the lamps 14 in some track sections being lighted successively in the manner hereinafter described to give a traveling effect.

In addition to the skeleton map hereinabove described, the name of the railway system or lines displayed in the skeleton map, namely, the X Y Z lines, also, appears upon the front of the framework. The letters of the said name are preferably secured to horizontal members 3 near the top of the framework, and have a plurality of electric lamps 15 attached to the front of same, there being, also, a border 16 around the said name, which border is secured to horizontal members 3 near the top of the framework and has a plurality of electric lamps 17 attached to the front of same. The names of the divisions, namely, Oklahoma-Texas, and Memphis-Birmingham-Florida, also, appear on the front of the framework, the letters composing same being secured to horizontal members 3 and having electric lamps 18 attached to the front of same.

In the skeleton map depicted in the drawings, all main lines have a connection with a common terminus, namely, "St. Louis." From the latter, a track section 6 leads to "Springfield" being the first track section of the Oklahoma-Texas division, and another track section 6 which is the first of the Memphis-Birmingham-Florida division leads to "Memphis". Three track sections 6 lead from "Springfield", one to "Fort Smith", another to "Oklahoma City", and the third to "Joplin". A track section connects "Fort Smith" and "Paris", and another connects the latter and "Dallas". Two track sections lead from "Dallas", one to "Fort Worth" and the other to "Houston", "Galveston" and "Brownsville" being connected with "Houston" by means of separate track sections. A track section of a branch line leads from "Houston" to "Beaumont", another from "Beaumont" to "Baton Rouge", and a third from "Baton Rouge" to "New Orleans". From "Oklahoma City" a track section 6 leads to "Quanah", and from "Joplin" another track section leads to "Wichita". From a junction point 19 on the track section 6 which connects "Springfield" and "Oklahoma", a branch track section leads to "Denison & Sherman", from which another track section leads to "Fort Worth". Another branch track section leads from the junction 19 to "Wyanoka" and another track section leads from the latter to a lamp-holder 20, which is secured to the front of the framework by any suitable means. A track section 6 connects "Memphis" and "Birmingham" and another track section 6 leads from "Birmingham" to another lamp-holder 20, which is, also, secured to the front of the framework by any suitable means.

Each lamp-holder 20 consists of a hollow casing preferably formed of sheet metal and having rearwardly-converging walls, the rear wall of same having lamp sockets 7 secured thereto in any suitable manner for the reception of electric lamps 8. An opening 21 in a wall of the lamp-holder 20 permits the lamp 8 to be renewed, and is provided with a door 22 which is preferably slidably supported over said opening. The front of said holder is closed by a piece 23 of glass or other suitable transparent or translucent material which is preferably formed with somewhat the shape of an arrow. The glass front 23 of the lamp-holder 20 that is connected with "Wyanoka" has "To California" painted or otherwise applied on its face to indicate that the line running from "St. Louis" to "Springfield" and "Wyanoka" either continues to California or connects with another line running to California. In like manner, "To Florida" is painted or otherwise applied on the face of the glass front 23 of the lamp-holder 20, which is connected with "Birmingham", the same indicating that the line running from "St. Louis" to "Memphis" and "Birmingham" either continues to Florida or connects with another line running to Florida.

The lamps 15 indicating the X Y Z lines and the lamps 17 in the border around same burn continuously, while the circuits of the lamps 8 in the lamp-holders 5 and 20, the lamps 14 indicating the track, and the lamps 18 indicating the names of the divisions may be controlled by any suitable means such as a flasher depicted in Fig. 2. The flasher shown in the drawings comprises an upper drum 24 mounted on a shaft 25, which may be revolubly supported by any suitable means (not shown), and two lower drums 26 and 27 mounted on a shaft 28, which may, also, be revolubly supported by any suitable means. An operating shaft 29, which may be driven by any suitable means such as an electric motor (not shown), bears a worm 30, which meshes with and drives a worm-gear 31 rigidly mounted on the shaft 28, the latter bearing a sprocket-wheel 32, which drives a sprocket-wheel 33 on shaft 25 through the medium of a sprocket-chain 34. Each drum is preferably insulated from its supporting shaft in the usual manner, and the periphery of the former bears means adapted to coöperate at intervals with a plurality of brushes 35 which are located adjacent to the periphery of said drum. The said means consists of plates secured to the periphery of the drums, the drum 24 having the plates 36, 37, 38, 39, 40, 41, 42, and 43 secured thereto, the drum 26 having the plates 44, 45, and 46 secured thereto, and the drum 27 having the plates 47 and 48 secured thereto, as best seen in Figs. 6, 7, and 8, respectively. Each drum has a connection with a cylindrical member 49 on its supporting shaft through the medium of a conductor 50, said member being, also, insulated from its supporting shaft and being always in engagement with a brush 51. A conductor 52, which leads from one side of a switch 53, connects through a fuse 54 with the brush 51, which engages the member 49 having a connection with the drum 27, and a conductor 55, which leads from the other side of the switch, also, connects through fuses 54 with the brushes 51 which engage the members 49 having connections with the drums 24 and 26, respectively, said switch being, also, connected with the positive and negative lines 56 and 57, respectively, of the supply circuit. Conductors 58 which lead from the individual brushes 35 pass through cables 59, and are connected separately with the lamps 8 in the particular city or station lamp-holders 5 having "St. Louis", "Springfield", "Fort Smith", "Paris", "Dallas", "Fort Worth", "Houston", "Galveston", "Brownsville", "Oklahoma City", "Quanah", "Joplin", "Wichita", "Wyanoka", "Memphis", and "Birmingham" on their lenses 9, the lamps 8 in the lamp-holders 20, and the lamps 14 in the track sections 6 connecting the said holders 5 and 20. Conductors 60, each having a connection with several lamps as depicted in Fig. 13, connect through fuses 61 with the return line 62 of the supply circuit. The conductor 52, also, connects through a fuse 54 with a brush 63, which is always in engagement with a cylindrical member 64 on the shaft 28. Said member 64 is preferably insulated from the shaft 28 and is electrically connected with members 65, 66, and 67 on said shaft through the medium of a conductor 68, said members 65, 66, and 67 being, also, insulated from said shaft. The member 65 bears arcuated plates 69 and 70, which are adapted to engage separately a brush 71, the member 66 bears arcuated plates 72 and 73, which are adapted to engage separately a brush 74, and the member 67 bears an arcuated plate 75 which is adapted to engage a brush 76. A conductor 77, which connects through a fuse 54 with the brush 71 leads to the lamps 18 indicating the Oklahoma-Texas division, a conductor 78, which connects through a fuse 54 with the brush 74, leads to the lamps 18 indicating the Memphis-Birmingham-Florida division, and a conductor 79, which, also, connects through a fuse 54 with the brush 76, leads to the lamps 8 in the lamp-holders 5 having "Denison & Sherman", "Beaumont", "Baton Rouge", and "New Orleans" on their lenses and the lamps 14 in the track sections between the junction point 19 and "Denison & Sherman", between the latter and "Fort Worth", between "Houston" and "Beaumont", between "Beaumont", and "Baton Rouge", and between "Baton Rouge" and "New Orleans", the circuits of these particular lamps 14 and 8 and the lamps 18 being, also, completed through some of the conductors 60, fuses 61, and the return line 62. Conductors 80, which lead from opposite sides of the switch 53, furnish electric power for the lamps 15 and 17, the circuits being completed through some of the conductors 60, fuses 61, and the return line 62.

In practice, it is preferable to use smaller lamps in the track sections 6 than in the lamp-holders 5 and 20, for example, 4-candle-power lamps 14 may be used in the track sections and 60-watt lamps 8 may be used in said lamp-holders. For the purpose of conspicuity and distinction, the lamps 8 in the lamp-holders 5 and 20 may have clear globes, while the lamps 14 in the track sections may have colored globes.

It will be observed that each plate borne by the drums 24, 26, and 27, with the exception of plates 42, 43, 46, and 47, has a sloping edge, which is the first part of same to engage its coöperating brushes 35, the sloping edge of the plate 36 consisting of the offset sections 81, 82, 83, 84, 85, and 86, the sloping edge of the plate 37 consisting of an unbroken section 87, the sloping edge of the plate 38 consisting of the offset sections 88 and 89, the sloping edges of the plates 39, 40, and 41 consisting of unbroken sections 90, 91, and 92, respectively, the sloping edge of the plate 44 consisting of the offset sections 93 and 94, the sloping edge of plate 45 consisting of an unbroken section 95, and the sloping edge of the plate 47 consisting of the offset sections 96, 97, and 98. The plates 36, 37, 38, 39, 40, 41, 42, 43, 44, 45, 46, 47, and 48 are predeterminedly and accurately arranged so that, when each drum is rotated in the direction of the arrows, Fig. 2, through a complete revolution to effect the proper flashing of the lamps in the manner hereinafter described, the plate 36 presents its sloping sections 81, 82, 83, 84, 85, and 86 successively to their respective brushes 31, then the plate 36 disengages said brushes 35 and the sloping section 87 of the plate 37 and the sections 88 and 89 of the plate 38 move successively into engagement with their respective brushes 35, next the plates 37 and 38 simultaneously disengage their respective brushes 35 and the sloping section 90 of the plate 39 and the sloping sections 93 and 94 of the plate 44 move successively into engagement with their respective brushes 35, then the plates 39 and 44 simultaneously disengage their respective brushes 35, and the sloping sections 91, 92, and 95 of the plates 40, 41, and 45, respectively, move successively into engagement with their respective brushes 35, then the plates 40, 41, and 45 simultaneously disengage their respective brushes 35 and the plate 42 and the sloping sections 96, 97, and 98 of the plate 47 move successively into engagement with their respective brushes 35, then the plates 42 and 47 simultaneously disengage their respective brushes 35 and the plates 43, 46, and 48 move simultaneously into engagement with their respective brushes 35, and lastly the plates 43, 46, and 48 simultaneously disengage said brushes. By this arrangement, the circuits of lamps 8 and 14 are successively closed so as to give a traveling effect, it being understood that all runs start at "St. Louis."

In the wiring of the lamps 14 in the track section 6 between "Dallas" and "Fort Worth" said lamps are preferably connected separately in multiple with the corresponding number of lamps 14 that are located in the track section 6 between "Dallas" and "Houston" adjacent to the latter, the lamps 8 in the lamp-holders 5 having "Fort Worth" and "Houston" on their lenses being, also, connected in multiple, it being, of course, understood that the circuit of each two multiple-connected lamps is controlled by one brush 35. In like manner, the lamps 17 in the track section 6 between "Houston" and "Galveston" are connected separately in multiple with a corresponding number of lamps 14 that are located in the track section between "Houston" and "Brownsville" adjacent to the latter, while the lamps 8 in the lamp-holders 5 having "Brownsville" and "Galveston" on their lenses, are, also, connected in multiple.

The members 65, 66, and 67 are so arranged relative to each other and the drums that just before any portion of the plate 36 engages a brush 35, the plate 69 engages the brush 71, thereby closing the circuit of the lamps 18 in the letters of the Oklahoma-Texas division. This plate 69 remains in engagement with said brush 71, while the plates 36, 37, 38, 39, 44, 40, 41, and 45 are moved into engagement with their respective brushes 35 as hereinabove described, and disengages said brush 71, so as to break the circuit of the lamps 18 in the letters of the Oklahoma-Texas division at the same time the plates 40, 41, and 45 disengage their respective brushes 35. Then the plate 72 on the member 66 engages the brush 74 just before any part of the plate 42 engages its brush 35, and thereby closes the circuit of the lamps 18 in the letters of the Memphis-Birmingham-Florida division. Said plate 72 remains in engagement with the brush 74 while the plates 42 and 47 are moved into engagement with their respective brushes 35 as hereinabove described, and disengages said brush 74 so as to break the circuit of the lamps 18 in the letters of the Memphis-Birmingham-Florida division at the same time the plates 42 and 47 disengage their respective brushes 35. Next, the plates 70, 73, and 75 on the members 65, 66, and 67 move into and then out of engagement with the brushes 71, 74, and 76, respectively, at the same time the plates 43, 46, and 48 move into and out of engagement with their respective brushes 35, with the result of closing and breaking the circuits of all the lamps 8, 14, and 18.

The operation of the apparatus is as follows: The closing of the switch 53 immediately closes the circuit of the lamps 15 in the name of the system or lines, namely, the X Y Z lines, and, also, the circuit of the lamps 17 in the border around said name, and energizes the drums 24, 26, and 27 and the members 65, 66, and 67. The shafts 25 and 28 being rotated in the direction of the arrows, Fig. 2, in the manner hereinabove described cause said drums and members to move the plates borne thereby into and out of engagement with their coöperating brushes, with the result of displaying separately some of the lines of the Oklahoma-Texas division, then displaying the line of the Memphis-Birmingham-Florida division, and lastly displaying the whole system.

First, the plate 69 moves into engagement with its brush 71 and thereby closes the circuit of the lamps 18 in the letters of the Oklahoma-Texas division.

Second, the sloping sections 81, 82, 83, 84, 85, and 86 of the plate 36 successively engage their respective brushes 35, whereby the section 81 closes the circuit of the lamp 8 behind the lens 9 bearing "St. Louis" and successively closes the circuits of the lamps 14 in the track section 6 from "St. Louis" to "Springfield" and, also, the circuit of the lamp 8 behind the lens 9 bearing "Springfield," then the section 82 successively closes the circuits of the lamps 14 in the track section 6 from "Springfield" to "Fort Smith" and, also, the circuit of the lamp 8 behind the lens 9 bearing "Fort Smith," then the section 83 successively closes the circuits of the lamps 14 in the track section 6 from "Fort Smith" to "Paris" and, also, the circuit of the lamp 8 behind the lens 9 bearing "Paris," then the section 84 closes the circuits of the lamps 14 in the track section 6 from "Paris" to "Dallas" and, also, the lamp 8 behind the lens 9 bearing "Dallas," next the section 85 successively closes the circuits of the lamps 14 in the track section 6 from "Dallas" to "Houston" and, also, the lamp 8 behind the lens 9 bearing "Houston" and at the same time successively closes the circuits of the lamps 14 in the track section 6 from "Dallas" to "Fort Worth" and, also, the lamp behind the lens 9 bearing "Fort Worth," and lastly the section 86 successively closes the circuits of the lamps 14 in the track section 6 from "Houston" to "Brownsville" and, also, the lamp 8 behind the lens 9 bearing "Brownsville" and at the same time successively closes the circuits of the lamps 14 in the track section 6 from "Houston" to "Galveston" and, also, the circuit of the lamp 8 behind the lens 9 bearing "Galveston," after which the plate 36 disengages its coöperating brushes 35, with the result of breaking the circuits of the particular lamps 8 and 14 controlled thereby.

Third, the sloping section 87 of the plate 37 and the sloping sections 88 and 89 of the plate 38 move successively into engagement with their coöperating brushes 35, whereby the section 87 of the plate 37 closes the circuit of the lamp 8 behind the lens 9 bearing "St. Louis" and successively closes the circuits of the lamps 14 in the track section 6 from "St. Louis" to "Springfield" and, also, the circuit of the lamp 8 behind the lens 9 bearing "Springfield," next the section 88 of the plate 38 successively closes the circuits of the lamps 14 in the track section 6 from "Springfield" to "Oklahoma City" and, also, the circuit of the lamp 8 behind the lens 9 bearing "Oklahoma City," and then the section 89 of the plate 38 successively closes the circuits of the lamps 14 in the track section 6 from "Oklahoma" to "Quanah" and, also, the lamp 8 behind the lens 9 bearing "Quanah," after which said plates 37 and 38 simultaneously disengage their coöperating brushes 35, so as to break the circuits of the lamps 8 and 14 controlled thereby.

Fourth, the sloping section 90 of the plate 39 and the sloping sections 93 and 94 of the plate 44 move successively into engagement with their coöperating brushes 35, with the result that the section 90 of the plate 39 closes the circuit of the lamp 8 behind the lens 9 bearing "St. Louis" and successively closes the circuits of the lamps 14 in the track section 6 from "St. Louis" to "Springfield" and, also, the circuit of the lamp 8 behind the lens 9 bearing "Springfield," next the section 93 of the plate 44 successively closes the circuits of the lamps 14 in the track section 6 from "Springfield" to "Joplin" and, also, the circuit of the lamp 8 behind the lens 9 bearing "Joplin," and then the section 94 of the plate 44 successively closes the circuits of the lamps 14 in the track section 6 from "Joplin" to "Wichita" and, also, the circuit of the lamp 8 behind the lens bearing "Wichita," after which the plates 39 and 44 simultaneously disengage their coöperating brushes 35 so as to break the circuits of the lamps 8 and 14 controlled thereby.

Fifth, the sloping sections 91, and 92, and 95 of the plates 40, 41, and 45, respectively, move successively into engagement with their coöperating brushes 35, whereby the section 91 of the plate 40 closes the circuit of the lamp 8 behind the lens 9 bearing "St. Louis" and successively closes the circuits of the lamps 14 in the track section 6 from "St. Louis" to "Springfield" and, also, the circuit of the lamp 8 behind the lens 9 bearing "Springfield," next the sections 92 and 95 of the plates 41 and 45 successively close the circuits of the lamps 14 in the track sections from "Springfield" to "Waynoka" and, also, the circuits of the lamp 8 behind the lens 9 bearing "Waynoka," the lamps 14 in the track section 6 from "Waynoka" to the arrow marked "To California," and the lamps 8 behind the lens 23 bearing "To California," after which the plates 40, 41, and 45 simultaneously disengage their coöperating brushes 35, with the result of breaking the circuits of the lamps 8 and 14 controlled thereby, while at the same time the plate 69 on member 65 disengages the brush 71, thereby breaking the circuit of the lamps 18 in the letters in the Oklahoma-Texas division.

Sixth, the plate 72 on the member 66 moves into engagement with the brush 74 and thereby closes the circuit of the lamps 18 in the letters of the Memphis-Birmingham-Florida division.

Seventh, the plate 42 and the sloping sections 96, 97 and 98 of the plate 47 move successively into engagement with their coöperating brushes 35, whereby the plate 42 closes the circuit of the lamp 8 behind the lens 9 bearing "St. Louis," the section 96 of the plate 47 successively closes the circuits of the lamps 14 in the track section 6 from "St. Louis" to "Memphis" and, also, the circuit of the lamp 8 behind the lens 9 bearing "Memphis," next the section 97 successively closes the circuits of the lamps 14 in the track section from "Memphis" to "Birmingham" and, also, the circuit of the lamp 8 behind the lens 9 bearing "Birmingham," and then the section 98 successively closes the circuits of the lamps 14 in the track section from "Birmingham" to the arrow marked "To Florida" and, also, the circuit of the lamps 8 behind the lens 23 bearing "To Florida," after which the plates 42 and 47 simultaneously disengage their coöperating brushes 35 so as to break the circuits of the lamps 8 and 14 controlled thereby, while at the same time the plate 72 disengages the brush 74, thereby breaking the circuit of the lamps 18 in the letters of the Memphis-Birmingham-Florida division.

Eighth, the plates 70, 73, and 75 on the members 65, 66, and 67 move simultaneously into engagement with the brushes 71, 74, and 76, respectively, and at the same time the plates 43, 46, and 48 move simultaneously into engagement with their coöperating brushes 35, thereby effecting the closing of the circuits of all the lamps 8, 14, and 18, after which said plates 70, 73, 75, 43, 46, and 48 simultaneously disengage their coöperating brushes with the result of breaking the circuits of all the lamps 8, 14, and 18 and completing the cycle.

It will be evident that while a line is being displayed by the successive closing of the circuits of the lamps 8 and 14 indicating same in the manner hereinabove described, there will be a slight pause at each city or station intermediate the terminals of the line before continuing the run, this being effected by the offset sections of the plates on the drums of the flasher.

It should be understood that the lines of any number of divisions may be displayed in the manner hereinabove described, and, if desired, instead of "St. Louis" being the beginning of the route, same may be the end of the route.

Various changes in the details of construction and arrangement of parts may be made without departing from the nature and spirit of this invention.

I claim:

1. The herein-described process of advertising consisting in intermittently displaying lines composing divisions of a system and having a common terminus, intermittently displaying the names of the divisions while their respective lines are being displayed, and continuously displaying the name of the system while the names of the divisions and the lines are being displayed.

2. The herein-described process of advertising consisting in separately displaying lines composing divisions of a system and having a common terminus, separately displaying the names of the divisions while their respective lines are being displayed, and subsequently displaying all the lines and the names of the divisions simultaneously.

3. The herein-described process of advertising consisting in intermittently displaying lines composing divisions of a system and having a common terminus, intermittently displaying the names of the divisions while their respective lines are being displayed, subsequently displaying all the lines and the names of the divisions simultaneously, and continuously displaying the name of the system while the names of the divisions and the lines are being displayed.

4. An advertising apparatus comprising illuminating means arranged to represent lines composing divisions of a system and having a common terminus, and illuminating means arranged to represent the names of the divisions, in combination with a flasher adapted to actuate said means to display the lines separately with a traveling effect from said terminus and separately displaying the names of the divisions while their respective lines are being displayed and subsequently to display all the lines and the names of the divisions simultaneously.

5. An advertising apparatus comprising illuminating means arranged to represent lines composing divisions of a system and having a common terminus, illuminating means arranged to represent the names of the divisions, and illuminating means arranged to represent the name of the system, in combination with a flasher means adapted to actuate said means to display the lines separately with a traveling effect from said terminus and separately displaying the names of the divisions while their respective lines are being displayed, subsequently to display all the lines and the names of the divisions simultaneously, and to display the name of the system continuously while the names of the divisions and the lines are being displayed.

6. An advertising apparatus comprising illuminating means arranged to represent lines composing divisions of a system and having a common terminus, illuminating means arranged to represent the names of the divisions, illuminating means arranged to represent the name of the system, and a framework supporting all of said means, in combination with a flasher means adapted to actuate said means to display the lines separately with a traveling effect from said terminus and separately displaying the names of the divisions while their respective lines are being displayed, subsequently to display all the lines and the names of the divisions simultaneously, and to display the name of the system continuously while the names of the divisions and the lines are being displayed.

7. In an advertising apparatus, the combination of illuminating means arranged to represent transportation lines, with means for controlling said illuminating means to display separately the lines with a traveling effect between their terminals and means for displaying the names of the divisions while the lines are being displayed.

8. In an advertising apparatus, the combination of illuminating means arranged to represent lines composing divisions of a transportation system and the names of such divisions and having a common terminus, and a flashing device comprising means for controlling the circuits of said means in such manner as to display separately the lines with a traveling effect from said terminus, to display separately the names of the divisions while their respective lines are being displayed and subsequently to close the circuits of all the means simultaneously to display all the lines and the names of the divisions simultaneously.

9. In an advertising apparatus the combination of illuminating means arranged to represent lines and names of lines composing divisions of a transportation system, and intermediate points, and having a common terminus, and a flashing device comprising means for controlling all of the circuits of said means in such manner as to produce a traveling effect between the terminals of each line separately with a pause at each intermediate point, the line and name display being intermittent.

In testimony whereof I hereunto affix my signature in the presence of two witnesses.

FRANK THOMPSON HOPKINS.

Witnesses:
GEORGE G. ANDERSON.
WALTER C. GUELS.